INVENTOR.
ABRAHAM J. ESSELINK

United States Patent Office 3,672,847
Patented June 27, 1972

3,672,847
REFORMER FURNACE
Abraham J. Esselink, Essenlaan, Netherlands, assignor to Selas Corporation of America
Filed Mar. 5, 1970, Ser. No. 16,649
Int. Cl. B01j 9/00
U.S. Cl. 23—288 M
2 Claims

ABSTRACT OF THE DISCLOSURE

This invention relates to a hydrocarbon steam reforming furnace in which the reforming tubes are coated on their inner surfaces with a catalyst. This permits the use of tubes that are smaller in diameter and longer than usual, and permits the tubes in this type of furnace to be bent into coils.

BACKGROUND AND SUMMARY

The present invention relates to furnaces used in the reforming of hydrocarbons and more particularly to that type of furnace known as a steam reformer.

The present technique of converting hydrocarbons with steam into hydrogen, carbon monoxide, and carbon dioxide comprises the reaction of hydrocarbons, usually methane and steam, at a temperature in the range of 1300° F. to 1750° F. and at pressures as high as 500 p.s.i. The reacting is done in externally heated tubes filled with catalytically active nickel in the form of rings or pellets.

The development of stronger heat resistant alloys has made it possible to use higher temperatures and pressures by making smaller diameter reactor tubes. The tube diameter, however, cannot be reduced below about 2 inches without introducing practical problems with catalyst loading. The catalyst loading problems are mainly caused by a lower ratio of tube diameter to catalyst size. If the catalyst size is reduced to keep the ratio to an acceptable level, it will cause a considerably higher pressure drop. This could be compensated for by shorter tubes, but shorter tubes will increase the required number of tubes and reduce the velocity of the reactants through them. This, in turn, will reduce heat transfer with the result that tube-wall temperatures will rise above acceptable limits.

It is an object of the invention to reduce the diameter of the reactor tubes without the adverse effects of catalyst loading problems, shorter tube lengths, or pressure drop limitations.

To overcome catalyst loading problems, the tubes, instead of containing catalyst rings or pellets as now universally used, will be coated on their inside with a catalytically active material. The principal of coated tubes leads to a number of possible reactor tube and reactor furnace configurations that are uniquely different from those presently known and used.

Catalyst filled tubes should be straight and in a vertical position to allow easy loading of the catalyst and to avoid bridging of the catalyst particles. Coated tubes, on the other hand, can be in any position and be of almost any length because of the low pressure drop. This permits great freedom for the design of the tube and firebox entity.

A factor of considerable importance with coated reactor tubes is that the low pressure drop through them permits the tubes to be made much longer than usual. With longer tubes the reactants have a high linear velocity and a high degree of turbulence at the catalyst-reactants interface, which contributes to high heat and mass transfer coefficients. By extending the length of the coated reactor tubes it becomes necessary to bend the tube into one or more loops, a structure commonly known as a serpentine coil. By the use of such a construction it is possible to obtain maximum heat exchange surface in the firebox with a minimum number of connections to inlet and outlet headers.

It is an object of the invention to provide a reformer furnace having small diameter, catalyst coated tubes of a unique configuration for such a furnace. It is a further object of the invention to provide a reformer furnace in which both the inlet and outlet connections to the reformer tubes are located adjacent to each other, thus simplifying the required piping for an installation of this type.

The reactor tubes of the present invention can be from ¼ to 2 inches in diameter, but preferably are between ½ and 1 inch in diameter. The catalyst coating can be placed in the tubes in any convenient manner and is usually a nickel oxide. Tubes of this type will have a pressure drop of from .073 p.s.i. to .73 p.s.i. per meter. This compares with a pressure drop of from .45 p.s.i. to 4.5 p.s.i. per meter with standard sized catalyst-filled tubes.

The much lower unit pressure drop encountered in the small diameter coated tubes permits them to be made several times longer than is presently common practice for the same pressure drop across the length of the tube. This, in turn, will permit a much higher space velocity of the reactants through the tubes with a resulting increase in heat transfer efficiency.

An additional advantage of the long, small diameter tubes is the elimination of the conventional pigtails between the tube ends and the manifolds. Also, piping is simplified because it is all placed at one end of the heater, in this case the top.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

IN THE DRAWINGS

DETAILED DESCRIPTION

Figure 1:
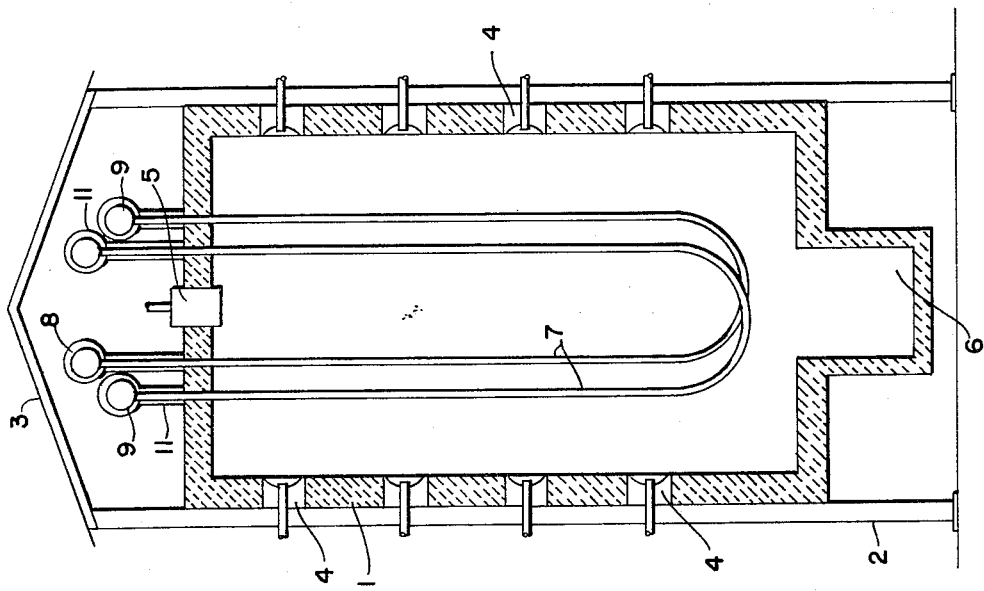
FIG. 1 is a section of a furnace in one form of the invention.

Referring to the drawings, there is shown in FIG. 1 a furnace 1 having a substantially rectangular chamber that extends in a direction perpendicular to the drawing. The furnace is constructed in accordance with ordinary furnace practice and is supported on structural members 2. These members extend above the furnace proper to support a roof 3. Vertical rows of burners 4 are located in the furnace side walls, and burners 5 are located in a row in the roof. The burners 4 are preferably of the radiant cup type and are preferably connected to be supplied with fuel in a conventional manner so that the burners can be adjusted individually or the burners in a row can be adjusted together. Burners 5 are preferably of the long flame type and fire downwardy into the furnace chamber. Combustion gases are collected in a flue 6 in the floor of the chamber and passed through a convection heater, in the usual manner, before being exhausted through a stack.

The reactor tubes 7, in this form of the invention, are provided with a U-bend and are suspended in the furnace chamber with the straight sections being substantially equal distances from the side walls. The ends of the tube project through openings provided in the roof and are fastened directly to and are supported by intake manifolds 8 and exhaust manifolds 9. The ends of the tubes above the roof and the manifolds are preferably covered with an insulating material 11. It is noted that burners 5 are midway between the vertical portions of the tubes.

The tubes are coated on the interior with a nickel oxide coating. Thus the unobstructed tube can be small. The tubes will be from 0.3" to 2" in diameter and preferably from 0.6" to 1". The tubes will be from 60 to 80 feet in length. Such length and diameter will insure a high space velocity of the reactants and a corresponding high heat transfer to them.

The rigid connection between the tube ends and the manifolds does away with the usual pigtails of furnaces of this type with a consequent simplification of piping connections. In addition, suspending the tubes from their upper ends does away with the trouble previously experienced by expansion and contraction of the tubes as they are heated and cooled.

In operation of the furnace heat is supplied substantially evenly around the entire length of each tube by burners 4 and 5. Burners 5 are preferably fired at a constant rate, while the rows of burners 4 are adjusted for temperature control of the tubes.

Figure 2:
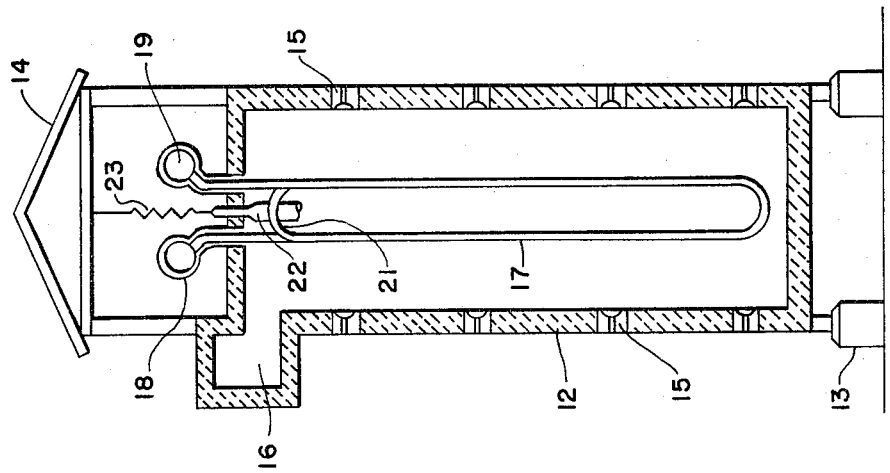
FIG. 2 is a sectional view showing another form the invention can take.

Another form that the invention can take is shown in FIG. 2. In this form the furnace 12 differs slightly from that of FIG. 1. The furnace is supported upon suitable foundations 13 and the framework extends above the furnace chamber to provide a compartment that is covered by a roof 14. Vertical rows of burners 15, preferably of the radiant cup type, are located in the oppositely disposed side walls. An exhaust duct 16 is provided at the top of one side wall through which products of combustion are withdrawn to be passed through a convection heating section before being discharged through a stack, as is usual. The burners are connected to be adjusted individually or in rows.

In this case, coils 17 are also supported from ends that extend through the roof of the furnace and are directly connected to inlet manifold 18 and outlet manifold 19, respectively. In this case, however, one or more loops 21 are formed in the coil between the ends to make what is generally called a serpentine coil. The upper ends of the loops are supported by brackets 22 that extend upwardly through the furnace roof. The brackets are normally biased upwardly by springs 23 which are fastened at one end to the bracket and at the other end to a stationary member in the furnace frame. The bracket and spring arrangement serve to hold loops 21 of the coils straight and to take up expansion of the loops as the coil is heated.

In this form of the invention, as in that previously described, the coil is a small diameter tube that has its inside surface coated with an active catalyst such as nickel oxide. In each form of the invention the tubes are made of an alloy steel capable of withstanding the temperatures encountered.

The coils are made of tubing that is preferably from 0.6 inch to 1 inch in diameter. Because the tubes are coated, they can be in coils up to 250 feet in length with the reactant pressure drop not exceeding 45 p.s.i. This is no larger than that encountered in a tube of conventional length filled with granular catalyst.

By using bent or serpentine coils a maximum possible heat exchange surface is installed in the furnace chamber with a minimum number of connections to inlet and outlet headers. Another advantage of using long reactor tubes is that the high degree of turbulence of the flowing reactants contributes to a low resistance to heat transfer from the tube wall to the reactants. Any local high temperatures in the furnace will be less likely to result in hot spots on the tube coil.

While in accordance with the provisions of the statutes I have illustrated and described the best form of embodiment of my invention now known to me, it will be apparent to those skilled in the art that changes may be made in the form of the apparatus disclosed without departing from the spirit and scope of the invention set forth in the appended claims, and that in some cases certain features of my invention may be used to advantage without a corresponding use of other features.

What is claimed is:

1. A reformer furnace for use in steam hydrocarbon reforming comprising structure forming a furnace chamber having side walls, a roof between the upper ends of said side walls and a floor, vertical rows of radiant cup burners in said side walls, a flue for gases created by said burners located in a position away from said roof, a supply manifold extending along and above said roof to one side of a centerline between said side walls, a discharge manifold extending along and above said roof on the other side of said centerline, elongated metal reaction tubes in hairpin shape between said rows of burners, the ends of said tubes being substantially parallel and projecting through said roof substantially midway between said side walls and below said manifolds respectively, one end of each said tube being directly attached to and supported by said intake manifold and the other end being directly attached to and supported by said discharge manifold with the remainder of said tubes hanging between said side walls in said chamber, and additional burners of the long flame type located in said roof directed to fire downwardly between the ends of said reaction tubes.

2. The combination of claim 1 in which the interior of said tube is coated with a catalyst.

References Cited

UNITED STATES PATENTS

| | | | |
|---|---|---|---|
| 3,274,978 | 9/1966 | Palchik et al. | 122—356 |
| 3,240,204 | 3/1966 | Von Wiesenthal | 23—288 M |
| 2,423,997 | 7/1947 | Ruegg | 122—275 X |
| 3,479,166 | 11/1969 | Hirt | 122—356 X |
| 3,257,172 | 6/1966 | Kao et al. | 23—288 M |
| 2,964,033 | 12/1960 | Throckmorton et al. | 122—356 X |
| 2,902,981 | 9/1956 | Throckmorton et al. | 122—356 |
| 2,250,052 | 7/1941 | Richerman et al. | 196—116 |
| 3,572,296 | 3/1971 | Carson et al. | 122—275 X |
| 3,572,999 | 3/1971 | Sato | 122—356 X |

NORMAN YUDKOFF, Primary Examiner

D. EDWARDS, Assistant Examiner

U.S. Cl. X.R.

23—277 R; 122—275, 356; 196—116